Feb. 28, 1967    A. B. NORKAITIS    3,307,102
ARMATURE TEST APPARATUS INCLUDING A PAIR OF TRANSFORMERS
AND MEANS FOR COMBINING THE SECONDARY VOLTAGES THEREOF
Filed July 7, 1964    3 Sheets-Sheet 3

INVENTOR
ANTHONY B. NORKAITIS
BY
Richard R. Lindberg
ATTORNEY

United States Patent Office 3,307,102
Patented Feb. 28, 1967

3,307,102
ARMATURE TEST APPARATUS INCLUDING A PAIR OF TRANSFORMERS AND MEANS FOR COMBINING THE SECONDARY VOLTAGES THEREOF
Anthony B. Norkaitis, Oak Lawn, Ill., assignor, by mesne assignments, to Avnet, Inc., Chicago, Ill., a corporation of New York
Filed July 7, 1964, Ser. No. 380,768
9 Claims. (Cl. 324—51)

This invention relates generally to equipment for analyzing the armatures and rotors of rotating electrical machines, and has particular reference to a machine for readily locating electrical defects in the armatures and rotors of automotive rotating electrical equipment.

Heretofore the determination of defective armatures of, for example, an automotive generator or starter has been done with what is known in the art as a growler. With such a device it is possible to learn rapidly that a coil of the armature is shorted between adjacent coils, but to determine the exact place on the armature where the short occurs requires that the armature be rotated slowly while on the growler, and a feeler held a short distance from the armature laminations. At the point where the shorted coils are positioned, a strong magnetic pull will be exerted on the feeler.

Such equipment, while generally satisfactory to indicate a good or bad armature, could not be operated rapidly enough to determine where the shorted coil was located. Nor could it indicate the quality of the connection of the coil ends to the commutator bars, be it open or of too high resistance, for example.

The invention herein makes it possible rapidly to determine the existence of a short between coils, the quality of the connection of the coil ends to the commutator bars, and the existence of a short between commutator bars, so that the assembly can be returned to production for correction.

In more modern automobiles the conventional D.C. generator has been replaced by an alternator having a rotor generally wound with an uncommutated D.C. winding, alternating current being developed in the stator winding thereof.

As a part of the invention herein, any short between coils of the winding or a bad connection of the winding to the slip rings of the rotor may readily be noted.

With the foregoing considerations in mind, it is a principal object of the invention to provide an improved analyzer for the armature of a rotating electrical machine.

Another object is to provide armature test apparatus capable with the coils of the armature of providing two paths of considerable current density, and to compare their dissimilarity to determine varying electrical qualities throughout the armature assembly.

Still another object is to provide an armature test apparatus wherein two relatively high current paths through opposed symmetrical windings of the armature are compared, the dissimilarity of the paths being compared to locate discrete points on the armature where a fault is present.

Yet another object is to compare the current paths taken through 180° apart portions of the armature, and to note the point of the armature fault by slowly rotating the same when the current paths are maintained therethrough.

Other objects and important features of the invention will become apparent from a study of the specification following taken with the drawings which show a preferred embodiment of the invention, and what is now considered to be the best mode of practising the principles thereof. Other embodiments may be suggested to those having the benefit of the teachings herein, and such embodiments are intended to be reserved, especially as they fall within the purview of the claims subjoined.

Figure 3:
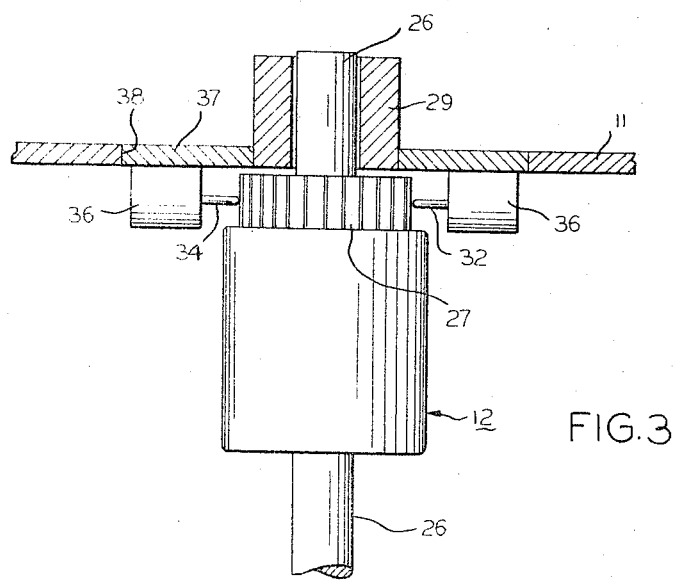
FIG. 3 is a view taken along the line 3—3 of FIG. 2 looking in the direction of the arrows, and showing an armature in position for testing on the analyzer panel board seen in FIG. 2.
Figure 4:
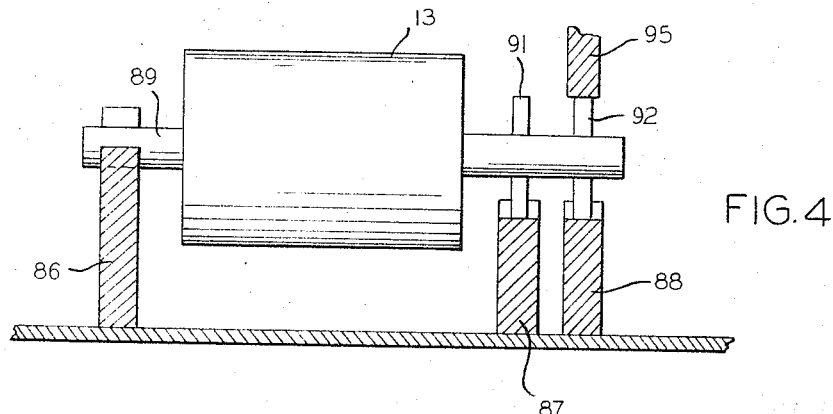
FIG. 4 is a view taken along the line 4—4 of FIG. 2 showing structure for mounting a rotor for testing.
Figure 5:
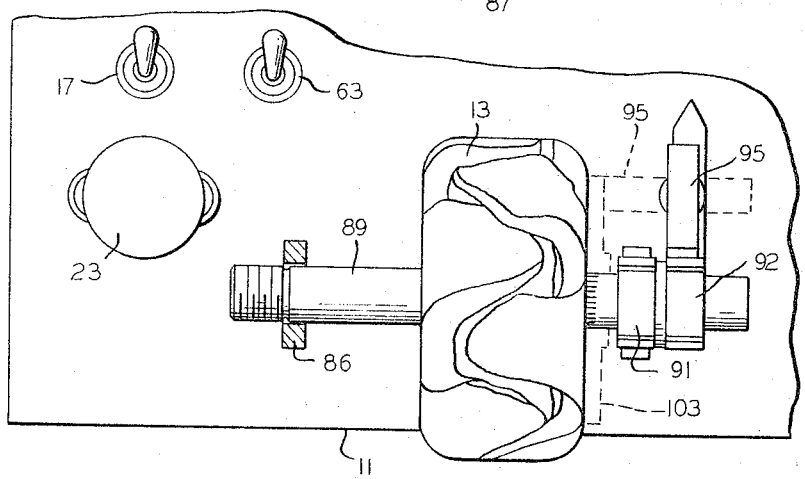
FIG. 5 is an elevational view of a portion of the panel seen in FIG. 2, showing an alternator rotor having a face slip ring, and the manner in which contact is made thereto.

Referring now to the drawings, the apparatus according to the present invention is denoted by the reference numeral 10, and includes a panel board 11 inclined from the vertical to support conveniently for test an armature indicated generally by the reference numeral 12, and shown somewhat schematically in FIG. 3. The panel board 11 also supports a rotor 13 for test as seen in FIGS. 4 and 5.

The panel board 11 is a front closure for a cabinet, not shown, which encloses circuit and power components seen schematically in FIG. 1, and which also supports fixtures mounting the armature 12 and rotor 13 for test, as well as various signal and switch components, for the testing and analysis of the rotor and armature, all of which will be described in detail as this specification proceeds.

Figure 1:
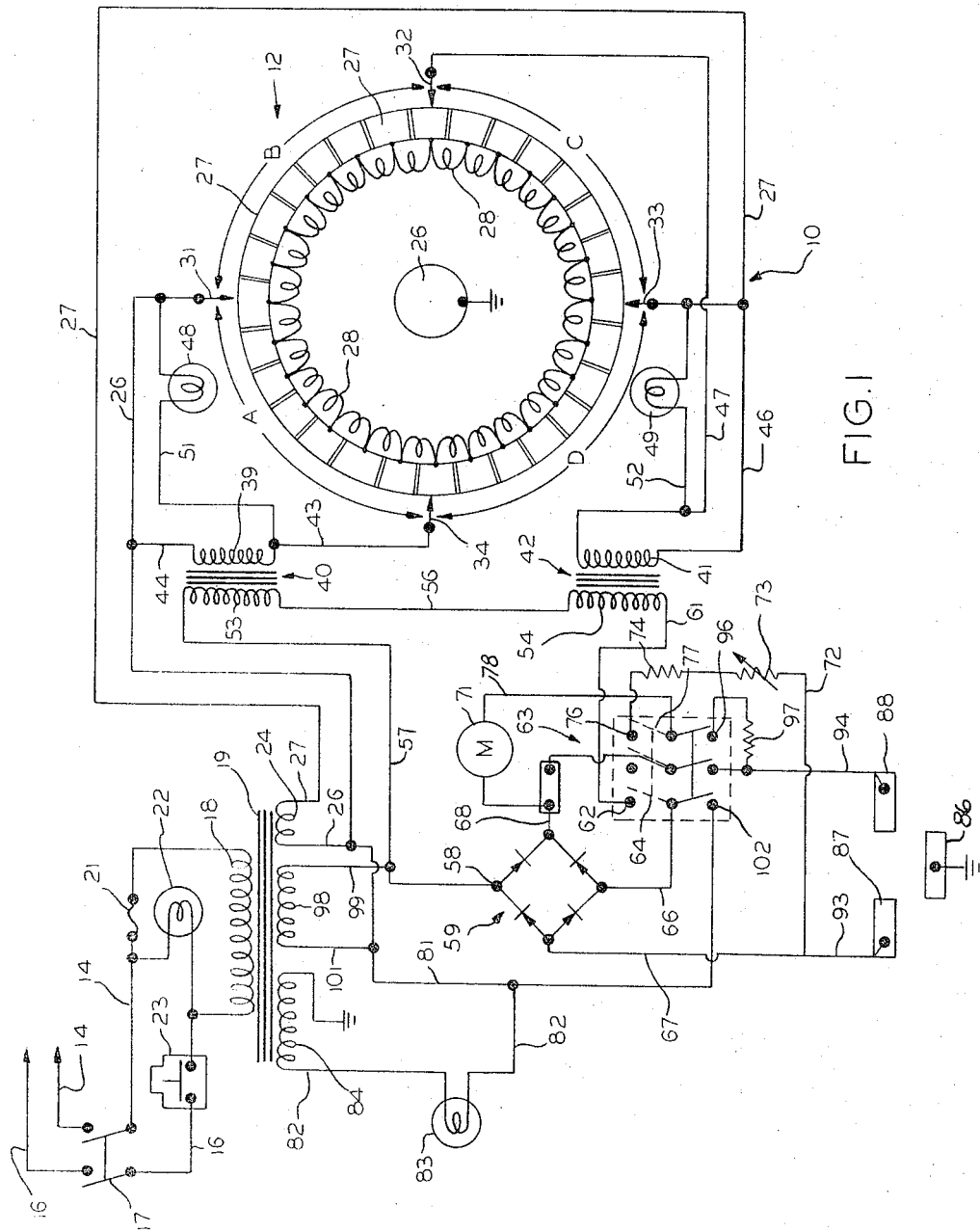
FIG. 1 is a circuit diagram of an armature test apparatus embodying the principles of the present invention.
Figure 2:
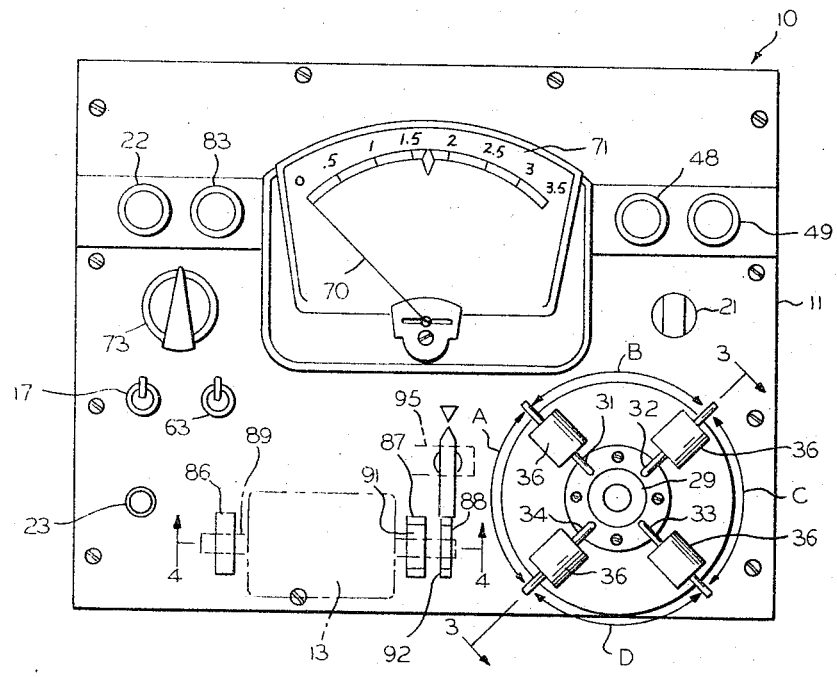
FIG. 2 is an elevational view of test apparatus panel board showing structure for indicating results from the testing of an armature, for the mounting of an armature for such testing, and for mounting of a rotor for testing.

Referring now particularly to FIGS. 1 and 2, the apparatus 10 includes a pair of A.C. power leads 14 and 16 at normal 110-v. potential. These are connected to the apparatus 10 through a main switch 17 and to a primary winding 18 of a supply or power transformer 19. A fuse 21 is connected in supply lead 14 and a signal lamp 22 is connected across leads 14 and 16 to indicate that main switch 17 and an operating switch 23 in line 16 are closed.

Figure 6:
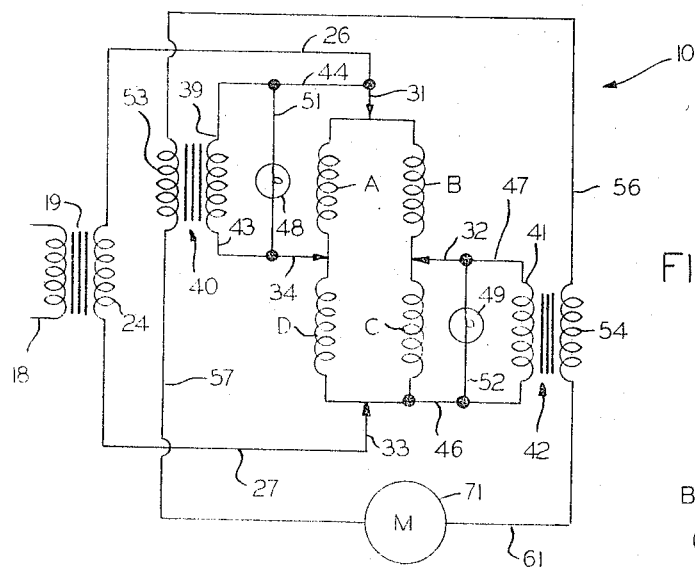
FIG. 6 is a simplified circuit diagram illustrating the test apparatus according to the invention.

Transformer 19 is of a step down type to develop a voltage of the order of 3 volts A.C. at current values up to 50 amperes across a secondary winding 24 thereof, leads 26 and 27 extending from opposite ends of secondary winding 24. The current in winding 24 is divided into two parallel paths across the armature 12 being tested, one path being A and D, and the other being B and C as seen in FIGS. 1 and 6.

It may be noted at this point that armature 12 is of the conventional type and includes a shaft 26, see also FIG. 3, and a plurality of commutator bars 27 connecting windings 28 therein in a well known manner. The armature shown is of the lap wound type, but it may as well be of the wave wound type where the windings are not connected at their ends to contiguous commutator bars 27, but to bars located a number of degrees apart.

Armature 12 is adapted to be rotatably supported on panel 11 in a fixture comprising a bushing 29 mounted on panel 11. Panel 11 supports 90° apart contact fingers 31, 32, 33 and 34 which are resiliently biased in directions to contact the surfaces of the commutator bars 27.

As seen in FIG. 3, contact fingers 31, 32, 33 and 34 are each mounted in a support 36 which contains the resilient means, not shown, for biasing the said fingers 31, etc. against the commutator bars 27. Each of the supports 36 is mounted on a circular plate 37 held in an opening 38 in the front panel 11.

That portion A of the windings 28 located between the contact finger 31 and the contact finger 34 is connected in parallel with a winding 39 of a transformer 40. Similarly, and symmetrical with portion A, that portion C of the winding 28 between contact fingers 32 and 33 is connected in parallel with a winding 41 of a transformer 42. Winding 39 of transformer 40 is connected by a lead 43 to the contact finger 34 and to the lead 26 by a lead 44. Similarly, transformer winding 41 is connected by a lead 46 to the contact finger 33, the circuit being completed by a lead 47 to the contact finger 32.

Winding 39 is connected in parallel with a signal lamp 48 connected in a lead 51 between lead 43 and contact finger 31. Similarly, winding 41 is connected in parallel with a signal lamp 49 connected in a lead 52 between lead 47 and contact finger 33.

The two transformers 40 and 42 have their respective secondaries 53 and 54 connected in series by a lead 56. One end of the secondary winding 53 is connected by a lead 57 to a terminal 58 of a selenium bridge rectifier 59, while the opposed end of the secondary winding 54 is connected by a lead 61 to a terminal 62 of a three pole-double throw switch indicated generally by the reference numeral 63 and having a contact arm 64 connected in series with a lead 66 to the other end of the bridge rectifier 59.

The rectified output of the selenium bridge rectifier 59 is impressed across a pair of leads 67 and 68, lead 68 being connected by a lead 69 to a meter 71 having an indicator pointer 70, see FIG. 2. The other lead 67 is connected to a lead 72 having a variable resistor 73 and a fixed resistor 74 connected in series therewith, lead 74 being connected to a contact 76 of the switch 63. A contact arm 77 of the switch 76 is connected to a lead 78 to the other side of the meter 71.

The structure thus far described is designed to test armatures and to simulate the operating conditions thereof, and is adapted to test open circuits in the windings 28 thereof, high resistance connections between such windings 28 and the commutator bars 27, and shorts and grounds in reclaimed or new armatures.

Consider a situation where it is desired to test an armature 12 which is first positioned in the bushing 29 on the panel 11. With the armature thus inserted into the bushing 29, care should be taken that the contacts 31 and 34 inclusive are each on the center of its contiguous commutator bar 27. If it is difficult to align the commutator bars 27 with the contacts 31 to 34, it may be inserted into the bushing 29 without regard to proper contacting on an appropriate bar 27. When test button 23 is depressed, the armature may be rotated slightly, and it will be noted that a slightly higher reading is had when the contacts 31 to 34 are between the bars 27, and lower when on the bars.

When the test circuit described is energized, the meter pointer 70 will come to the null point on meter 71 depending on the line voltage at power leads 14 and 16. This shows that the armature is a good one, but if the pointer 70 is not at the null point, it may be centered by appropriately adjusting variable resistor 73. This will remain unchanged in position unless line voltage changes.

It may be noted at this point that transformers 40 and 42 have different turns ratio for a reason as will be described. Transformer 40 has, for example a turns ratio of 1:2 between primary and secondary, while transformer 42 has a turns ratio of 1:1.8 between primary and secondary. With an impressed voltage of 1.5 v., across the two primary coils 39 and 41 respectively, the voltage sum across the two secondaries 53 and 54 will be 5.7 volts. It will be noted that if voltage drops across windings portions B and D are equal, both lamps 48 and 49 will glow equally, but at a relatively low intensity. As seen in FIG. 2, the armature test switch 63 is moved to the "armature test" position which corresponds to the dotted line position of the switch 63 as seen in FIG. 1. When the test switch button 23 is depressed the light 22 will light, and the meter 71 will indicate the armature condition, the armature being a good one when pointer 70 is in the centered position.

The apparatus thus far described is particularly adapted to locate an open coil in the windings 28 of the armature 12. It will also locate a coil having an extremely high resistance, as by reason of a faulty connection to a commutator bar 27 by determining the characteristics of coils in the several winding sections A to D.

Consider now the location of an "open" in section A or a coil therein having high resistance. When the expression "open" is used herein it means also a coil of extremely high resistance. If winding portion A is open, and since winding portion D has very small resistance, the full voltage will be impressed across contact fingers 31 and 34, full voltage being impressed across winding 39 and lamp 48. This will cause lamp 48 to glow brightly, and transformer winding 53 to develop twice the impressed voltage.

The voltage impressed across winding portions B and C and lamp 49 and transformer winding 41 causes lamp 49 to glow normally and winding 41 to have normal voltage developed thereacross. Winding 54 will develop 1.8 times the normal voltage, and the combined voltages of secondaries 53 and 54 will be larger as shown by the swing of pointer 70 on meter 71.

To locate the position of the open coil the armature 12 is rotated slowly in the bushing 29 in a clockwise direction. The illumination of lamp 48 is observed and when it becomes dim (normal), the open coil, or a coil of high resistance, connected to the commutator bar 27 now at contact finger 31 will now be at portion B of the windings 28, in the first coil beyond such commutator bar. At this time lamp 49 will be darkened, since no voltage is impressed across winding portions B and C. Winding 41 likewise will not have any voltage impressed thereacross and the pointer 70 will swing to the left of the centered position, since the total voltage is less than that for a good armature.

If the armature test is commenced with the "open" in portion B, the reading on meter 71 will be low, and lamp 49 will be darkened. Lamp 48 is glowing normally and transformer winding 39 is conducting normally, since the impressed voltage is across both portions A and D. The location of the open bar in portion B is determined by rotating armature 12 slowly in a clockwise direction. When lamp 49 glows brightly the open coil is just beyond contact finger 32, and now at the beginning of portion C at commutator bar 27 at finger 32.

Since full voltage is impressed across winding 41 and only normal voltage across 39, pointer 70 will again swing to the right.

If the armature test is commenced with the "open" in portion C, the reading on meter 71 is high for reasons as just previously described. Lamp 48 glows normally, and as the armature 12 is rotated slowly in a clockwise direction, lamp 49 will suddenly glow normally (dim). The open coil will be at the commutator bar 27 contacted by finger 33, such open coil now being in the portion D.

At this time lamp 48 will be extinguished and the pointer 70 will swing to the left, since less than a normal total voltage is being developed, transformer winding 39 at this time not being energized.

If the armature test is commenced with the "open" in portion D, the reading on the meter will be low for reasons as just previously described, and for the reason that no voltage is developed across lamp 48 and transformer winding 39. To locate the open bar in portion D, the armature is rotated slowly in a clockwise direction, and when lamp 48 glows brightly, the open is located at finger 34.

The apparatus according to the invention also makes it possible readily to determine the existence of a shorted coil (one that is shorted by a short across a pair of contigous commutator bars). The armature is placed in position and turned slowly. Upon rotation of armature 12 the shorted bars therein will cause a change in the reading on meter 71, from low to high, or high to low, every quarter turn thereof. The location of the shorted bars will be had as they move past the contact fingers 31 to 34, at which time the meter readings will change as described.

The structure according to the present invention is capable of indicating the existence of a grounded winding therein. To this end a circuit is provided for indicating the presence of such fault in armature 12. Considering that a partially complete grounding circuit will be made at the commutator bars 27 to ground at the contact fingers 31 to 34, such circuit will be completed through a lead 81 connected to one end of transformer winding 24, through an indicator lamp 83 and thence through a voltage developing winding 84 on transformer winding 19. It will be seen that irrespective of which of the contact fingers 31 to 34 completes a ground connection, the circuit will be completed through lamp 83 and winding 84.

Structure is provided for the testing of rotors such as are employed in more modern automobiles. Such rotors are adapted to develop A.C. voltage in the stators thereof, which voltage is subsequently rectified to provide D.C. power for the functioning of the vehicle. Accordingly, and as seen particularly in FIGS. 1, 4 and 5 the panel 11 has a plurality of spaced rotor supporting standards 86, 87 and 88 extending therefrom. Standard 86 is grounded and adapted to support a shaft 89 of the rotor 13. Standards 87 and 88 are adapted respectively to engage slip rings 91 and 92 supported on shaft 89 and insulated therefrom, these slip rings being connected to opposite ends of the coil, not shown, forming part of the rotor 13.

Standards 86, 87 and 88 are shown schematically in FIG. 1, standard 87 being connected by a lead 93 to the lead 67 which in turn is connected to one end of bridge rectifier 59. Slip ring 92 is adapted to be connected to a slip ring contactor 95 and thence to a lead 94 through a resistor 97 to a contact 96 of the switch 63. When switch 63 is moved to the full line position seen in FIG. 1, the blade 77 closes on contact 96 to complete a circuit through meter 71 and thence by lead 68 to the other terminal of bridge rectifier 59.

Power for the bridge rectifier 59 in this position of switch 63 is derived from a winding 98, it being connected by a lead 99 and the lead 57 to terminal 58 of the bridge rectifier 59. The other end of winding 98 is connected by a lead 101 to the lead 81 and thence to the other input terminal of rectifier 59 by switch arm 64 which is closed on a terminal 102 and the lead 66.

In certain cases the rotor 13 is provided with a face type slip ring 103, and in such cases the slip ring contactor 95 is rotated to a position as seen in FIG. 5 to contact such slip ring. The contactor 95 is mounted suitably in panel 11 for such contact, but in the ordinary case it is in the solid line position seen in FIG. 5 where rotor 11 has two slip rings 91 and 9 as shown.

In the usual cases the rotor 13 carries a single winding connected across the slip rings 91 and 92, or 91 and 103 as the case may be. Since most rotors of this kind are designed for 12 v. in automotive use the winding 98 is adapted to develop 14 v. across the bridge rectifier 59 to give 12 v. D.C. output. In the case of testing of the rotor 13 the meter 71 is connected as an ammeter and the pointer swing noted. If the swing is in accordance with the manufacturer's rating the rotor is a good one.

If the rotor is grounded, the pointer swing may be proper, but signal lamp 83 will light indicating such ground. The circuit indicating such ground includes the grounded coil in rotor 13, slip ring 91, lead 93, lead 67, a leg of the bridge rectifier 59, contact arm 64, contact 102, lead 81, lead 82, lamp 83 and winding 84 therein, and thence to ground.

If the rotor 13 has high resistance, the meter 71 has either no reading or a low one. If meter 71 shows no reading, the power switches 17 and 23 should be checked.

If rotor 13 is shorted in its coil, the resistance thereof will be smaller, and the reading on meter 71 much higher.

From the description foregoing it will be apparent that there has been provided a new and useful improvement in the art of testing and locating defects in the armatures and rotors of rotating electrical equipment. The testing of armatures is had by circuitry providing two current paths through the armature, each of these current paths being symmetrical with respect to the armature axis. The testing of the armature for open or high resistance coils therein, or for open or high resistance connections to the commutator bars includes the careful comparison of two paths through the armature under current conditions approximating or exceeding actual operating conditions, noting the deviations from the test conditions obtaining from a good armature, and from such deviations noting the point in the armature where the fault occurs.

The aparatus according to the invention will also note immediately the evistence of a ground therein. In the case of rotors for developing A.C. it will immediately note whether the coil thereof is open or of a high resistance or grounded.

While the invention has been described in terms of a preferred embodiment thereof, its scope is not intended to be limited by the precise embodiment herein shown, nor otherwise than by the terms of the claims here appended.

I claim:
1. In armature test apparatus for an armature having a number of coils connected at each end to commutator means to define an armature winding, the combination comprising a fixture for rotatably supporting said armature, a pair of current carrying members for contacting said commutator means, means for supporting said current carrying members, said armature being adapted to be rotated during the testing thereof while supported on said fixture relatively with respect to said current carrying members, means for impressing an alternating voltage across the coils of said armature at a power level corresponding to actual operating conditions of said armature, said last named means including said current carrying members and being connected with the coils of said armature during the testing thereof to provide two identical current paths between said current carrying members through the coils of said armature, further contact members connected with the coils of said armature during testing thereof, said further contact members connecting identical current path portions of said coil current paths in parallel with circuits including a transformer having primary and secondary windings, the turns ratio of one of said transformers being different from the turns ratio of the other, means for combining the voltages impressed across the secondary windings of said transformers, and meter means adapted to have the combined voltages impressed thereacross as a measure of the condition of the windings in one of the said current paths.

2. The invention as defined in claim 1 wherein each of said identical current path portions have indicator means connected in parallel therewith.

3. The invention as defined in claim 2 wherein said indicator means are identical as to indication when said current paths are identical.

4. The invention as defined in claim 2 wherein said indicator means are of an illuminated type.

5. The invention as defined in claim 1 wherein the means for impressing an alternating voltage across the coils of said armature includes a power transformer.

6. The invention according to claim 5 wherein said power transformer includes an auxiliary winding having visual indicator means energized thereby when a coil of said armature is grounded.

7. The invention according to claim 1 wherein rectifier means are connected between said meter means and the secondary windings providing said combined voltage.

8. The invention according to claim 1 wherein the combined voltage across said secondary windings is impressed across rectifier means, and wherein the output from said rectifier means is impressed across meter means to give a reading corresponding to said combined voltage.

9. The invention according to claim 1 wherein the means for impressing an alternating voltage includes a transformer having a winding for developing a voltage across a rotor being tested, and wherein said developed voltage is impressed across said rectifier means and said meter means to give a reading corresponding to the condition of said rotor.

References Cited by the Examiner
UNITED STATES PATENTS

| | | | |
|---|---|---|---|
| 1,906,030 | 4/1933 | Whelchel | 324—51 |
| 2,593,131 | 4/1952 | Foust et al. | 324—51 |
| 2,704,824 | 3/1955 | Ward | 324—51 |

WALTER L. CARLSON, *Primary Examiner.*

G. R. STRECKER, *Assistant Examiner.*